US012701202B2

(12) United States Patent
Osei-Kusi

(10) Patent No.: US 12,701,202 B2
(45) Date of Patent: Aug. 4, 2026

(54) SYSTEM AND METHOD FOR INTEGRATING CAMERAS WITH VISUAL ARTIFICIAL INTELLIGENCE IN ELECTRIC VEHICLE CHARGING STATIONS

(71) Applicant: Pirl Technology Inc., Rockville, MD (US)

(72) Inventor: Kwabena Osei-Kusi, Frederick, MD (US)

(73) Assignee: PIRL TECHNOLOGY INC., Rockville, MD (US)

( * ) Notice: Subject to any disclaimer, the term of this patent is extended or adjusted under 35 U.S.C. 154(b) by 0 days.

(21) Appl. No.: 18/435,989

(22) Filed: Feb. 7, 2024

(65) Prior Publication Data

US 2024/0388677 A1    Nov. 21, 2024

Related U.S. Application Data

(63) Continuation-in-part of application No. 18/349,493, filed on Jul. 10, 2023, now Pat. No. 12,233,731.

(Continued)

(51) Int. Cl.
*H04N 7/18*        (2006.01)
*G06V 20/52*       (2022.01)
*G08B 13/196*      (2006.01)

(52) U.S. Cl.
CPC ............. *H04N 7/183* (2013.01); *G06V 20/52* (2022.01); *G08B 13/19636* (2013.01); *G06V 2201/08* (2022.01)

(58) Field of Classification Search
None
See application file for complete search history.

(56) References Cited

U.S. PATENT DOCUMENTS

| 8,413,833 B1 | 4/2013 | Taylor et al. | |
| 11,748,817 B2 * | 9/2023 | Szott ...................... | G06Q 40/08 |
| | | | 705/4 |

(Continued)

OTHER PUBLICATIONS

Feb. 28, 2024 Final Office Action issued in U.S. Appl. No. 18/349,493.

(Continued)

*Primary Examiner* — Nancy Bitar
(74) *Attorney, Agent, or Firm* — GIBRALTAR CONSULTING LLC; Tariq Najee-Ullah

(57) ABSTRACT

The present disclosure introduces an Electric Vehicle (EV) Charger Camera Visual Artificial Intelligence System (EV-CVAIS), integrating cameras with visual artificial intelligence into electric vehicle charging stations. These stations may incorporate EV-CVAIS, featuring a camera for monitoring, security, and visual AI analysis. The camera can capture images or video of the EV and its surroundings, regardless of charging status or EV presence, with options for remote viewing or local storage. The EV-CVAIS may serve security purposes by detecting and deterring theft or vandalism. Moreover, the EV-CVAIS utilizes visual AI algorithms to analyze captured images or video, offering insights such as EV make and model identification, maintenance issue detection, or EV occupancy assessment. Additionally, an integrated alarm system is included in the EV-CVAIS, activated upon vandalism or certain actions detection, enhancing security measures.

15 Claims, 10 Drawing Sheets

Related U.S. Application Data

(60) Provisional application No. 63/443,974, filed on Feb. 7, 2023.

(56)                     References Cited

U.S. PATENT DOCUMENTS

| | | | |
|---|---|---|---|
| 2003/0120442 A1 | 6/2003 | Pellegrino et al. | |
| 2019/0351783 A1 | 11/2019 | Goei | |
| 2020/0070672 A1 | 3/2020 | Vahedi et al. | |
| 2020/0329579 A1 | 10/2020 | Triplett et al. | |
| 2022/0024334 A1 | 1/2022 | Marczi | |
| 2022/0332201 A1 * | 10/2022 | Khamashta | B60L 53/14 |
| 2023/0077868 A1 * | 3/2023 | Burns | B60R 25/305 |
| | | | 348/148 |
| 2023/0166630 A1 | 6/2023 | Hafezinasab et al. | |
| 2023/0175641 A1 * | 6/2023 | Cunliffe | G08G 1/04 |
| | | | 404/6 |
| 2024/0059176 A1 * | 2/2024 | Carlsson | G08C 17/02 |
| 2024/0388677 A1 * | 11/2024 | Osei-Kusi | G08B 13/19636 |

OTHER PUBLICATIONS

Oct. 24, 2023 Non-Final Office Action issued in U.S. Appl. No. 18/349,493.

Notice of Allowance dated Nov. 20, 2024 issued in U.S. Appl. No. 18/349,493.

* cited by examiner

*300*

400

410

Sensors
420

Real-Time EV Charger Monitoring
Controller
430

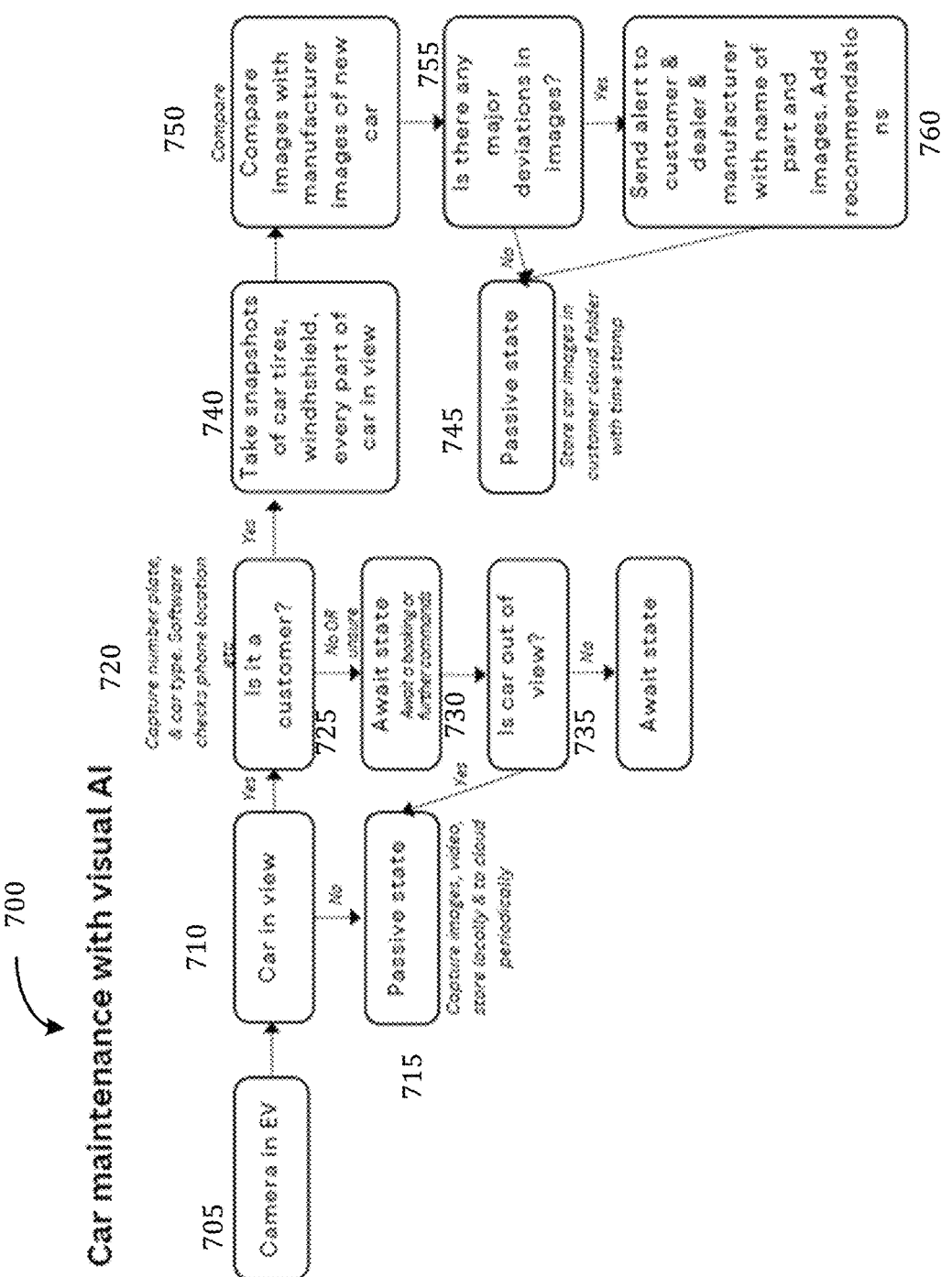

Car maintenance with visual AI

700

705 Camera in EV

710 Car in view

715 Passive state — Capture images, video, store locally & to cloud periodically 720 Capture number plate & car type. Software checks phone location etc.

725 Is it a customer?

730 Await state — Assist booking or further commands

735 Is car out of view?

Await state

740 Take snapshots of car tires, windshield, every part of car in view

745 Passive state — Store car images in customer cloud folder with time stamp

750 Compare — Compare images with manufacturer images of new car

755 Is there any major deviations in images?

760 Send alert to customer & dealer & manufacturer with name of part and images. Add recommendations

FIG. 7

Vandalism & theft with visual AI

SYSTEM AND METHOD FOR INTEGRATING CAMERAS WITH VISUAL ARTIFICIAL INTELLIGENCE IN ELECTRIC VEHICLE CHARGING STATIONS

RELATED APPLICATIONS

Under provisions of 35 U.S.C. § 119 (e), the Applicant claim the benefit of U.S. provisional application No. 63/443,974, filed Feb. 7, 2023, which is incorporated herein by reference. Further Applicant claims benefit of application Ser. No. 18/349,493 filed Jul. 10, 2023 which claims the benefit of U.S. provisional application No. 63/368,072, filed Jul. 11, 2022, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present invention relates generally to electric vehicles, electric vehicle chargers, electric vehicle charging infrastructure and security domain, focusing on the design of an innovative EV charging station, and modular approaches to electric vehicle chargers allowing for access of the internal charging circuits and electronic components to repair, replace and upgrade.

BACKGROUND OF THE DISCLOSURE

Electric vehicles (EVs) are rapidly gaining mainstream acceptance with millions sold globally as economies transition from petroleum-powered to battery-powered transport. However, the charging stations (or chargers) needed to transfer energy from a power source, such as the grid, to the onboard batteries of electric vehicles face several challenges.

Chargers experience significant wear and tear, and acts of vandalism, that often make them unavailable for use. The current state of art requires customers to call or email to report a non-working charger. The repair period can take several weeks, since an electrician needs to visit the installation, determine the fault, order the parts, and return to complete the repair. During this downtime, EV owners experience increased range anxiety as the reduced ability to charge limits the range of their vehicles. The downtime also reduces the revenue of commercial charging station owners.

Another challenge of charging stations is the risk of obsolescence. Charging technology is rapidly evolving and installed chargers are quickly becoming out-of-date. To keep up, charging station owners, especially commercial ones, must replace them often. If the current situation continues, by 2030, over a million tons of electronic waste is expected to be generated from discarded charging stations. This is financially and environmentally expensive.

There are two categories of chargers based on the current delivered: alternating current (AC) and direct current (DC). These are further divided into three types based on the power level: Level 1 (AC) outputs power in the 1.3 kW and 2.4 kW range; Level 2 (AC) outputs power in the 3 kW to 19 kW range; and Level 3 (DC) operates with an output of 350 kW and more.

In conventional situations, charging station operators encounter substantial hurdles, including the high cost of repairing or replacing stations, often exceeding the initial station price due to skilled labor expenses. Additionally, the absence of visual evidence complicates identifying the cause of charger malfunctions, whether from user error or vandalism, creates additional costs and hinders successful insurance claims. Consequently, operators are hesitant to repair broken stations, resulting in fewer operational stations and disgruntled EV drivers. Thus, there's a pressing demand for an innovative charging station equipped with a means to provide visual evidence to detect, prevent, and monitor station issues effectively. Therefore, there still exists a need exists in the field for a novel charging station comprising a camera for the detection, prevention, and monitoring of the station.

BRIEF OVERVIEW

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are and explanatory only and are not restrictive of the disclosure, as claimed.

The present disclosure relates to an apparatus, system and method for integrating cameras with visual artificial intelligence in electric vehicle charging stations. The present disclosure relates to an EV Charger Camera Visual Artificial Intelligence System (EV-CVAIS). The present disclosure may pertain to an EV Charger Camera Visual Artificial Intelligence System (EV-CVAIS). An EV charging station may be described, which may incorporate EV-CVAIS comprising a camera for monitoring, security, and visual AI analysis purposes. In one or more instances, images or video of the EV and its surroundings may be captured by the EV-CVAIS camera, regardless of charging status or EV presence, with options for remote viewing or local storage.

In one or more embodiments, EV-CVAIS may serve security purposes. EV-CVAIS security scenarios may include but not be limited to theft or vandalism detection wherein deterrence can be facilitated. Additionally, for the EV-CVAIS, visual AI algorithms may be utilized by EV-CVAIS to analyze captured images or video, offering insights such as EV make and model identification, maintenance issue detection, and EV occupancy assessment. Furthermore, EV-CVAIS may provide for an integrated alarm system, which may be activated upon vandalism detection. The EV-CVAIS can be configured to alert authorities or nearby individuals for enhanced security. In one or more embodiments, the EV-CVAIS may provide for remote monitoring and management of this alarm system via network connection or other means of connection. The present invention pertains to an EV charging station integrating a camera for monitoring, security, and visual AI analysis, with FIG. 1A, 1B representing the preferred embodiment. Other embodiments include: In one embodiment, an electric vehicle charger, EV-CVAIS features a camera without a display screen. In another embodiment, an electric vehicle charger, EV-CVAIS incorporates a camera external to the charger.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 7 is a flow chart of a method for providing car maintenance using the EV Charger Camera Visual Artificial Intelligence System (EV-CVAIS).

DETAILED DESCRIPTION OF THE DISCLOSURE

Figure 1A:
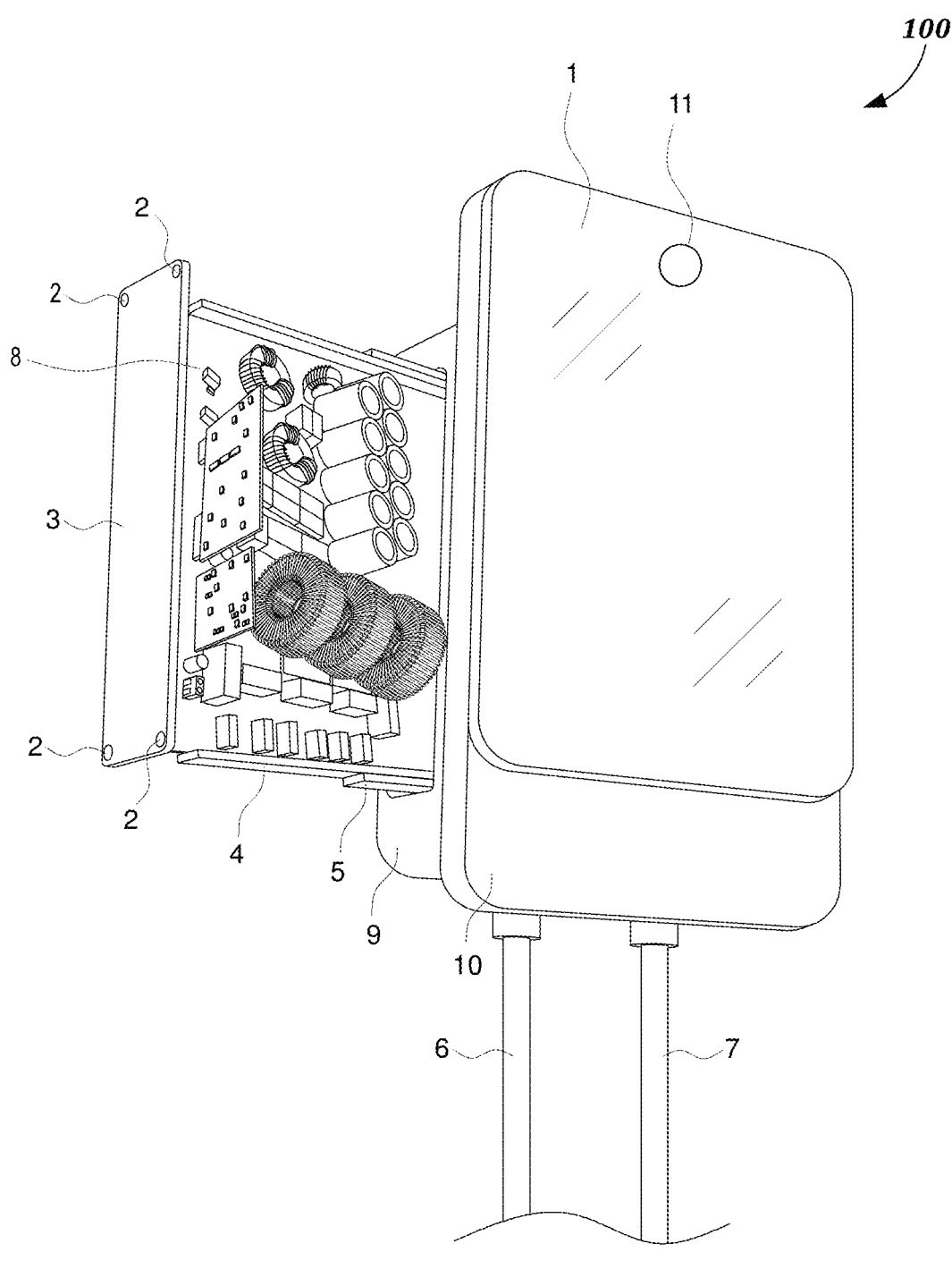
FIGS. 1A and 1B depicts example EV Charger Camera Visual Artificial Intelligence System (EV-CVAIS) at a perspective view and having a motherboard container partially removed during operation, according to one or more embodiments shown and described herein.

The present disclosure includes many aspects and features. Moreover, while many aspects and features relate to, and are described in, the context of a EV-CVAIS, embodiments of the present disclosure are not limited to use only in this context. The present disclosure can be understood more readily by reference to the following detailed description of the disclosure and the examples included therein.

Before the present articles, systems, apparatuses, and/or methods are disclosed and described, it is to be understood that they are not limited to specific methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated, some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed apparatuses, systems, and articles of the disclosure as well as the apparatuses themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and apparatuses of the disclosure. Thus, if there are a variety of additional steps that can be performed it is understood that each of these additional steps can be performed with any specific aspect or combination of aspects of the methods of the disclosure.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Platform Overview

Consistent with embodiments of the present disclosure, an apparatus, system and method for integrating cameras with visual artificial intelligence in electric vehicle charging stations may be provided. This overview is provided to introduce a selection of concepts in a simplified form that are further described below. This overview is not intended to identify key features or essential features of the claimed subject matter. Nor is this overview intended to be used to limit the claimed subject matter's scope. The EV Charger Camera Visual Artificial Intelligence System (EV-CVAIS) may be used by individuals or companies to for contactless charging, monitoring, security, and visual AI analysis.

The present disclosure relates to an EV Charger Camera Visual Artificial Intelligence System (EV-CVAIS). The present disclosure pertains to an EV Charger Camera Visual Artificial Intelligence System (EV-CVAIS). An EV charging station is described, which incorporates EV-CVAIS comprising a camera for monitoring, security, and visual AI analysis purposes. In one or more instances, images or video of the EV and its surroundings are captured by the EV-CVAIS camera, regardless of charging status or EV presence, with options for remote viewing or local storage.

Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

Various hardware components may be used at the various stages of operations follow the method and computer-readable medium claims. For example, although the methods have been described to be performed by a computing device, it should be understood that, in some embodiments, different operations may be performed by different networked elements in operative communication with the computing device. For example, server and/or computing device 500 may be employed in the performance of some or all of the stages disclosed with regard to the methods claimed below. Similarly, apparatus 100, 200, 300, or 400 may be employed in the performance of some or all of the stages of the methods. As such, apparatus 100, 200, 300, or 400 may comprise at least those architectural components as found in computing device 500.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein. Finally, the claims are not structured in the same way non-provisional claims are structured. For example, indentations indicate optional/dependent elements of a parent element.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

Figure 1B:
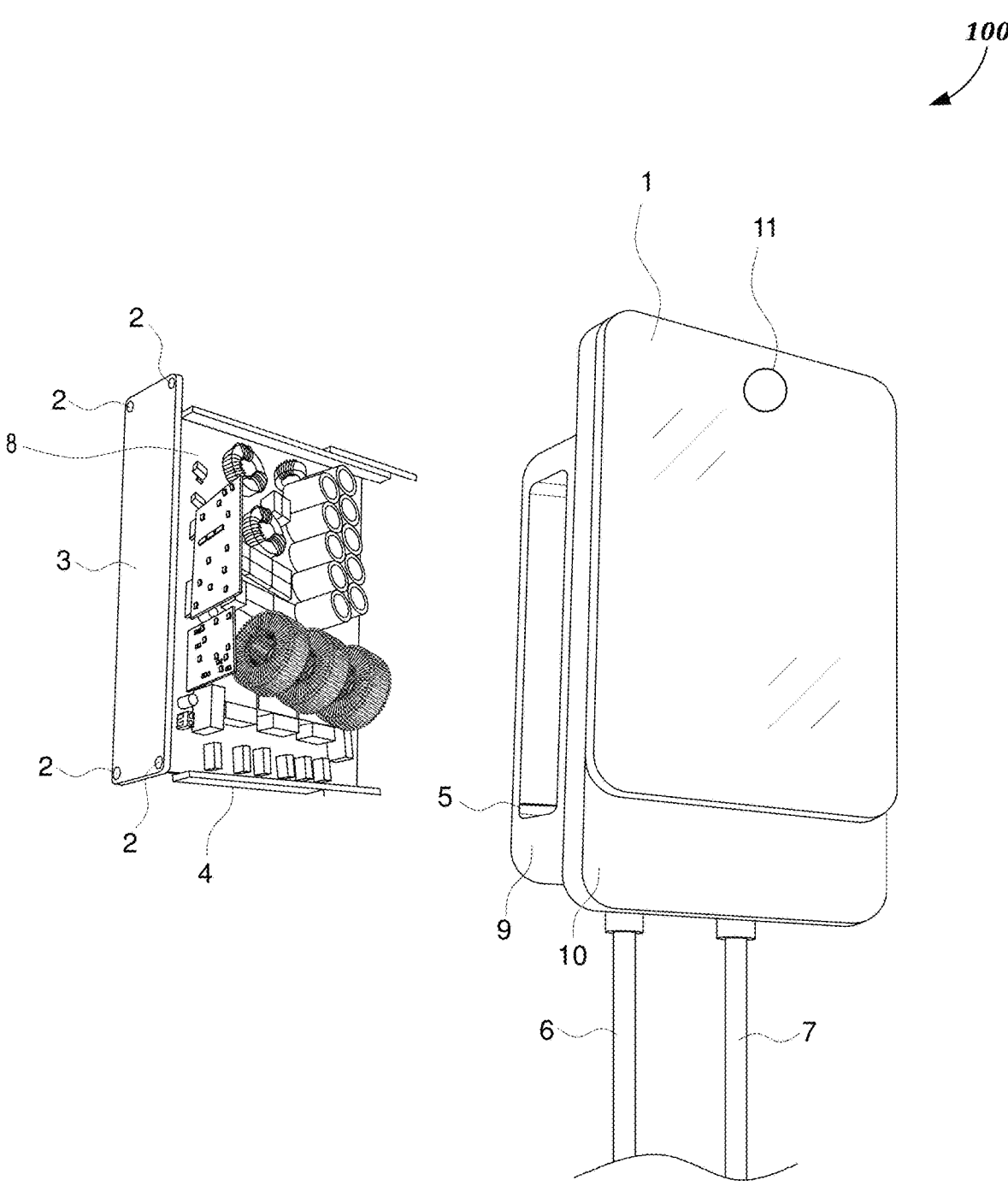

FIG. 1A and FIG. 1B illustrates one possible operating environment through which a platform consistent with embodiments of the present disclosure may be provided. By way of non-limiting example, an EV-CVAIS platform 100 may be hosted on a centralized server 500, such as, for example, a cloud computing service. A user may access platform 100 through a software application. The software application may be embodied as, for example, but not be limited to, a website, a web application, a desktop application, and a mobile application compatible with a computing device 500. One possible embodiment of the software application may be provided by the Pirl Technology™ suite of products and services provided by Pirl Technology LLC.

As will be detailed with reference to FIG. 5 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

FIGS. 1A and 1B illustrate non-limiting examples of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

I. Embodiments of the present disclosure provide a software and hardware platform comprised of a distributed set of modules, including, but not limited to:

Contactless Charging EV-CVAIS Module 520
Car Maintenance EV-CVAIS Module 530
Security EV-CVAIS Module 540

In some embodiments, the present disclosure may provide an additional set of modules for further facilitating the software and hardware platform. The additional set of modules may comprise, but not be limited to:

Temperature Module
Humidity Module
Pressure Module
Voltage Module
Power Module
Current Module
Near Field Communication (NFC) Module
Motion Module
Audio Module
Alarm Module
Security Module
Visual AI Module
Dust Module EV-CVAIS Module
Content Display Module; and
Content Transmission/Streaming Module.

Figure 4A:
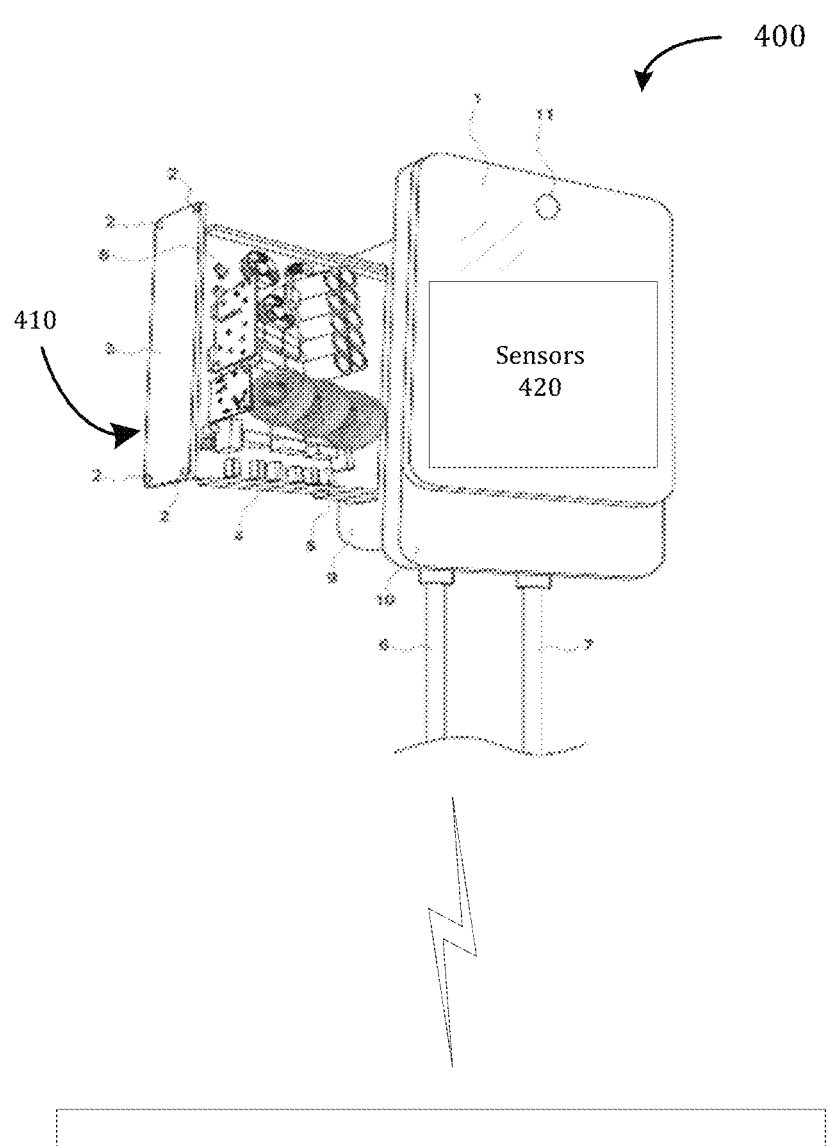
FIGS. 4A and 4B depicts an example real-time EV monitoring system for use with the EV Charger Camera Visual Artificial Intelligence System (EV-CVAIS), according to one or more embodiments shown and described herein.
Figure 4B:
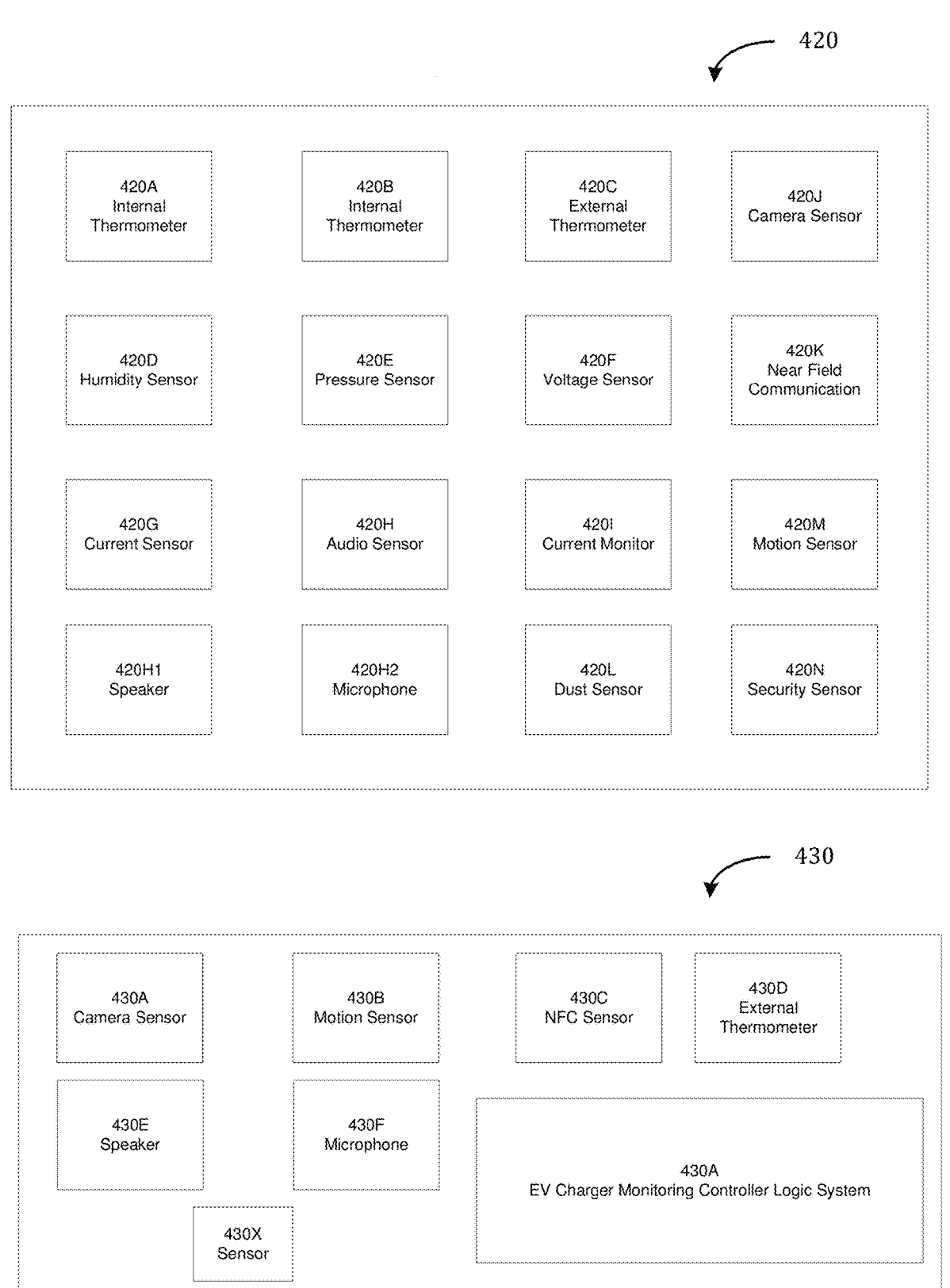
Figure 5:
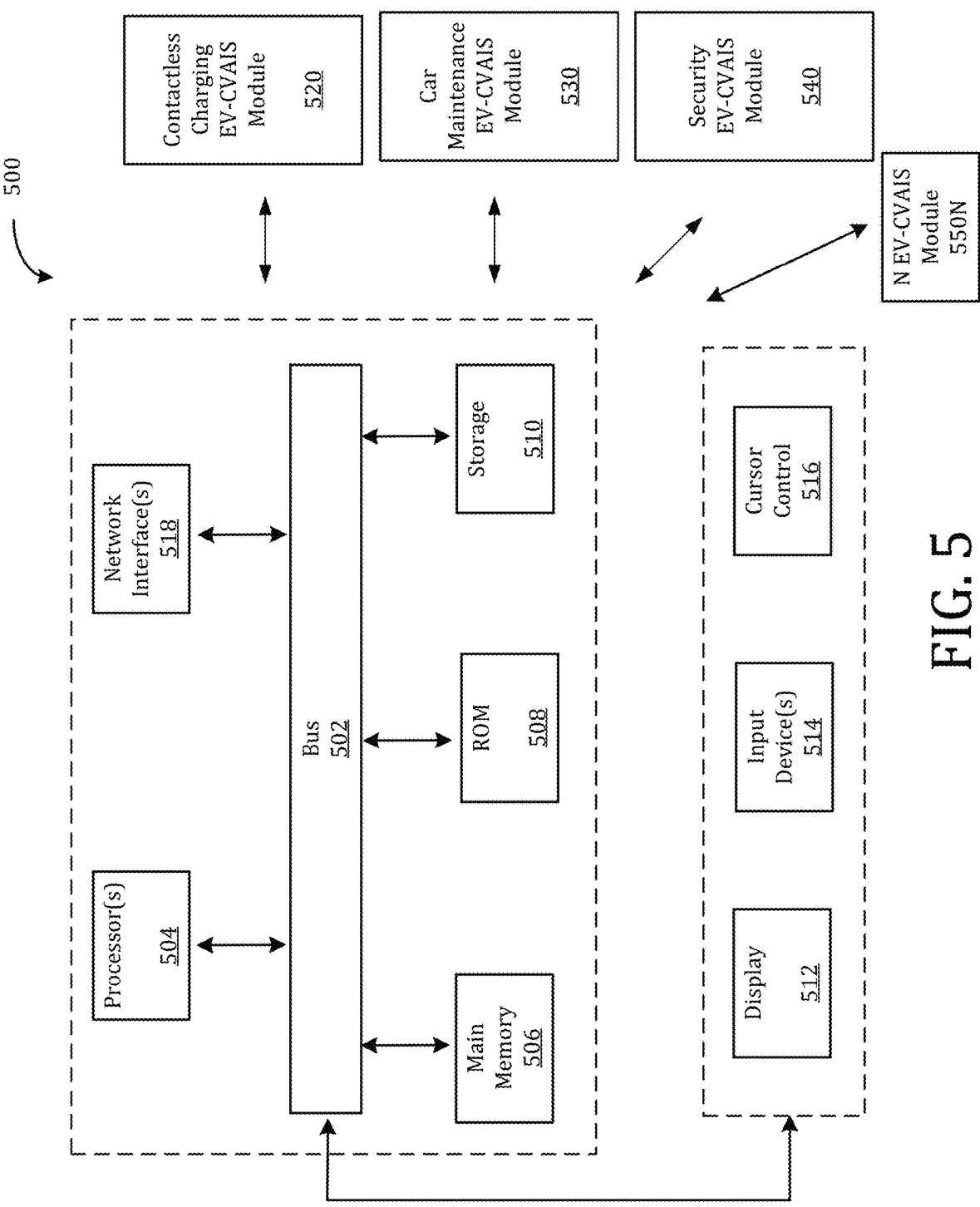
FIG. 5 depicts an example of a computer system that may be used in implementing the EV Charger Camera Visual Artificial Intelligence System (EV-CVAIS), according to one or more embodiments shown and described herein.

II. Embodiments of the present disclosure provide a software and hardware platform comprised of a distributed set of computing elements, including, but not limited to:

A Computing Device
A Camera
An EV Charger Camera Visual Artificial Intelligence System (EV-CVAIS)
The computing device comprising, but not limited to at least one of the following:
A processing unit,
A memory storage,
Wherein the computing device may be embodied as a mobile computing device,
wherein the mobile computing device comprises, but is not limited to,
A tablet,
A smartphone,
A drone,
A wearable camera,
A handheld camera,
An installed camera, and
A remotely operable recording device;
Wherein the computing device may comprise sensing devices,
wherein the sensing device may comprise, but is not limited to,
A camera, and
A speaker, and
A microphone; and
Wherein the computing device may be in communication with sensing devices, wherein the sensing devices provide telemetry data associated with the computing device;

Wherein the computing device may be embodied as any of the computing elements illustrated in FIG. 4A, 4B, or FIG. 5 including, but not limited to, Temperature Module, Humidity Module, Pressure Module, Voltage Module, Power Module, Current Module, Near Field Communication (NFC) Module, Motion Module, Audio Module, Alarm Module, Security Module, Visual AI Module, Dust Module, EV-CVAIS Module, Content Display Module; and Content Transmission/Streaming Module.

The EV-CVAIS platform may be operative to control at least one of the following sub-modules of a computing device: A user interface module, A content capturing module, A timing module, A location module, An orientation module, and A communications module and all aforementioned modules.

For example, the User Interface Module may: Enables user-control of the Computing Device, Enables user-control of the Sub-Modules of the Computing Device: The user interface module, the content capturing module, the timing module, the location module, the communications module, Temperature Module, Humidity Module, Pressure Module, Voltage Module, Power Module, Current Module, Near Field Communication (NFC) Module, Motion Module, Audio Module, Alarm Module, Security Module, Visual AI Module, Dust Module, EV-CVAIS Module, Content Display Module; and Content Transmission/Streaming Module.

The user interface module may enable user-control of the Platform Modules: Including but not limited to the content generation module, the content transmission module, the content organization module, the content display module, Temperature Module, Humidity Module, Pressure Module, Voltage Module, Power Module, Current Module, Near Field Communication (NFC) Module, Motion Module, Audio Module, Alarm Module, Security Module, Visual AI Module, Dust Module, EV-CVAIS Module, Content Display Module; and Content Transmission/Streaming Module.

For security operations, the EV-CVAIS platform may provide for a Content Capturing Module wherein the content capturing module may provide for: Enables operative control of content recordation hardware, sensing device, use of optical sensors, audio sensors, and/or telemetry sensors. The EV-CVAIS platform may further: enables capturing based on data: recordation of content received from the communications module, recordation of content displayed on the computing device (e.g., screen capture). The EV-CVAIS platform may further: enable Digital Signal Processing on captured content, enable Content Stitching based on, but not limited to, spatial parameters and temporal parameters, enables image processing techniques such as, but not limited to, image stabilization.

The EV-CVAIS platform may provide for a timing module wherein the timing module may provide: operative control of a clock associated with the computing device; in operative communication with a central clock; time stamps content captured by the content capturing module; be used for syncing various content streams of EV vehicle data.

The EV-CVAIS platform may provide for a location module wherein the timing module may provide: enables the reading and communicating of location data associated with a sensing device; the location data may be obtained by way of, for example, but not limited to: GPS/IP Address/Triangulation, LAN/WAN.

The EV-CVAIS platform may provide for an orientation module wherein the timing module may provide: enables the capture of orientation data from multiple sensing devices associated with the content capture module.

The EV-CVAIS platform may provide for a communications module wherein the timing module may provide: enables the networking of the multiple content capture modules associated with multiple networked devices; in operative communication with other communications modules of computing devices capturing content.

Various hardware components may be used at the various stages of operations follow the method and computer-readable medium claims. For example, although the methods have been described to be performed by a computing device, it should be understood that, in some embodiments, different operations may be performed by different networked elements in operative communication with the computing device. For example, server and/or computing device 500 may be employed in the performance of some or all of the stages disclosed with regard to the methods claimed below. Similarly, apparatus 100, 200, 300, or 400 may be employed in the performance of some or all of the stages of the methods. As such, apparatus 100, 200, 300, or 400 may comprise at least those architectural components as found in computing device 500.

With reference now to the drawings, and in particular FIG. 1A, 1B through FIG. 8 thereof, examples of the EV-CVAIS and the principles and concepts thereof will be described.

In an embodiment, an EV-CVAIS implements an electric vehicle (EV) charger which distinctly includes charging circuits and internal electronics that are placed on a removable motherboard. The motherboard contains the charging circuits which receive energy from a source such as the electric grid and delivers it to the onboard battery of an electric vehicle. Thus, the disclosed embodiments realize a new approach in EV chargers by implementing removable components, such as a removable motherboard. Once removed, the motherboard can be repaired or replaced with an updated module, making the EV-CVAIS retrofittable. Furthermore, the EV-CVAIS, as disclosed herein, realizes a plethora of advantages associated with achieving modularity in charger components including the capability to repair and/or upgrade the EV-CVAIS while the charger is currently installed and on a site.

In an embodiment, a real-time EV charger monitoring system is implemented as a comprehensive sensor system for monitoring the operational parameters of an EV charger in real-time during its operation to ensure that the EV charger is operating optimally. The real-time EV charger monitoring system can be utilized with the EV-CVAIS, as disclosed herein. For example, the real-time EV charger monitoring system includes a plurality of sensors that collect real-time data from several components of the EV charger in manner that allows the system to obtain and analyze operational parameters indicating how the EV charger is currently operating. Thus, by actively monitoring the function of the EV charger in real-time while in use (e.g., real-time data collection and analysis), the real-time EV charger monitoring system can enhance the EV charger's charging efficiency, safety, and overall performance. Moreover, operational information for EV chargers that can be gleaned from the real-time EV charger monitoring system over time can be used to improve the design and development of EV chargers in a manner that improves on any degradation and failures detected after deployment (e.g., while the EV chargers are being used in the field), thereby providing better performance for EV chargers currently used in industry and in the future to progress the technology.

In order to combat negative impacts on the climate and cutting emissions associated with industry, transportation, motorized vehicles, etc., the development of new clean energy technologies has emerged. One such "clean energy" technology is electric vehicles (EVs), where EVs are designed to convert electrical energy (e.g., from a battery) into mechanical energy in a manner that eliminates the cost and unclean emissions related to gasoline fueling. An EV is defined as a vehicle that can be powered by an electric motor that draws electricity from a stored energy source, such as a rechargeable battery or fuel cell, and is capable of being charged from an external source. Some EVs are considered all-electric vehicles, being powered only by an electric motor that draws electricity from a battery. Other EVs are hybrids, where the vehicle can be powered by an electric motor that draws electricity from a battery and is also propelled by an internal combustion engine, such as a plug-in hybrid electric vehicle. EVs may realize a plethora of benefits, in addition to the environmental advantages (e.g., zero tailpipe emissions), including smooth electric performance, energy efficiency, convenience, and lower maintenance costs (e.g., fewer moving parts than gasoline vehicles).

Many EVs have batteries that are energy-dense lithium-ion type batteries. Typically, a bigger battery (measured in kilowatt-hours, or kWh) means more electric range. In general, EVs are cheaper to recharge in comparison to refueling gasoline vehicles. For instance, with every mile of driving, the cost of electricity to recharge an EV is typically a fraction of what that same mile would cost to refuel with gasoline. The battery of an EV can be recharged using an external source, also referred to as an EV charger (also referred to herein as a charging station). An EV charger (or electric vehicle supply equipment) is a piece of equipment that supplies electrical power for charging plug-in EVs. There are two main types of charging stations: AC charging stations and DC charging stations. Recharging an EV often involves inserting a charging plug from the charging station into the charge port of the EV. For example, the charging plug of the EV can be considered equivalent to a fuel nozzle at a gas station. Electrically recharging EVs provide several benefits over gasoline refueling, such as increased simplicity, cost-effectiveness, and convenience.

FIG. 1A and FIG. 1B depicts an example configuration of the EV-CVAIS 100. As disclosed herein, the EV-CVAIS 100 implements an EV charger (or electric vehicle supply equipment), where the repairable and upgradable electric vehicle charger 100 functions as a piece of equipment that supplies electrical power for charging plug-in EVs. As a general description, the EV-CVAIS 100 is electric vehicle supply equipment that is modularly designed, having at least one accessible compartment (e.g., removable container), and charging circuits and internal electronics that are implemented on a removable motherboard. The motherboard contains the charging circuits which receive energy from a source such as the electric grid and delivers it to the onboard battery of an electric vehicle. The invention represents a new approach in chargers by presenting a removable motherboard. Once removed, the motherboard can be repaired or replaced with an updated module, making the invention retrofittable. This can be done while the charger is installed and on a site. This modular architecture is centered on the removable motherboard container (3). The charger is mechanically de-energized by disconnecting the input power source (6). The charger can also be de-energized electronically through a signal sent wirelessly to the charging circuit via Bluetooth or Wi-Fi, among other processes and designs used in the current state of the art to de-energize live electric components. After de-energizing, the motherboard container (3) can be safely unscrewed and removed.

FIG. 1A and FIG. 1B illustrates an example configuration that is suitable for the EV-CVAIS 100 to be employed as a Level 2 EV Charger. However, it should be understood that the example configuration for the EV-CVAIS 100 shown FIG. 1A is not intended to be limiting and that the elements and functions of the disclosed embodiments can be applied to across a wide range of EV chargers in the industry having varying current (e.g., AC and DC) and voltage requirements. For example, it will be evident to one skilled in the art that the disclosed embodiments may accommodate the design and the power requirements (e.g., higher, or lower) of Level 1, Level 2 and Level 3 types of EV chargers without departing from the scope of the disclosure.

As background, EVs can be charged using EV chargers (or EVSE) operating at different charging speeds. For example, Level 1 EV chargers and Level 2 EV chargers are standard forms of electric vehicle supply equipment that are currently used in industry, distinguished by their charging speed, voltage, and the corresponding infrastructure that is required.

Level 1 EV chargers operate on a standard residential 120-V (120V) AC outlet and typically deliver power in a range of 1.4-1.9 kilowatts (kW). Generally, Level 1 EV chargers are the most basic and widely available form of EV charging and can be easily installed using a common (e.g., household) electrical outlet. However, due to its lower power output, Level 1 EV chargers function relatively slowly and may take several hours (e.g., overnight) to fully charge an electric vehicle, depending on its battery capacity. For example, Level 1 chargers can take 40-50+ hours to charge a Battery Electric Vehicle (BEV) to 80 percent from empty and 5-6 hours for a Plug-In Hybrid Electric Vehicle (PHEV). As previously described, the disclosed EV-CVAIS 100 can be configured as a Level 1 EV charger in some embodiments, without departing from the scope of the disclosure.

Level 2 EV chargers offer high-rate AC charging for EVs (in comparison to Level 1 EV chargers). Level 2 EV chargers are configured to charge through 240V (in residential applications) or 208V (in commercial applications) electrical service, similar to that used for large appliances (e.g., electric stoves, dryers, etc.). Level 2 EV chargers can deliver power in a range of 7-19 kW, and provide significantly faster charging in comparison to Level 1 EV chargers. With Level 2 EV chargers, an EV can charge at a much higher rate, reducing the charging time to a few hours or less. For example, a Level 2 EV charger can charge a BEV to 80 percent from empty in 4-10 hours and a PHEV in 1-2 hours. Level 2 EV charging stations typically require professional installation, for instance by an electrician, and are commonly found in public charging stations, workplaces, and residential settings. Level 2 and Level 3 (described in detail in reference to FIG. 3) equipment have been deployed at various public locations including, for example, at grocery stores, theaters, or coffee shops. Level 2 EV chargers differ from the aforementioned Level 1 EV chargers due to charging speed (e.g., power output) and voltage requirements. When selecting between Level 1 and Level 2 charger type for design and use, considerations can include voltages, resulting charging and vehicle dwell times, available infrastructure, individual charging needs, and estimated up-front and ongoing costs.

The EV-CVAIS 100 implemented as a Level 2 EV charger, as shown in FIGS. 1A and 1B, can be used as a charging station. For example, the EV-CVAIS 100 can be installed as a wall-mounted or freestanding charging station. In operation, the EV-CVAIS 100 acts as a fixed location for a user to come and plug-in their EV and receive the electrical power supplied (from the for EV-CVAIS 100) for charging their EV. The EV-CVAIS 100 can comprise components (not shown in FIG. 1) needed in order to function as a Level 2 EV charger, including but not limited to: a power supply (e.g., 208-240 V); and connectors (e.g., SAE J1772 connector) which can be inserted directly into a charging port of an EV to facilitate the transfer of electrical power (between the charger 100 and the EV) that charges a battery of the EV.

FIG. 1A and FIG. 1B illustrates particular components of the EV-CVAIS 100 that collectively achieve the EV charger's 100 distinct modular structure and EV charging capabilities. As seen in FIG. 1, the disclosed EV-CVAIS 100 comprises several components, including: a display screen 1; attachment elements 2 shown as screws; removable motherboard container 3; rack 4; rack holder 5; input power cable 6; charging plug 7; motherboard 8; enclosure 9; face 10; and camera 11.

The display 1 can be a digital display screen which presents visual information related to the operation of the EV-CVAIS 100, for instance displaying details and feedback that is associated with the EV charging process (e.g., charging status, charging rate, battery level, connector status, payment information, error messages, and the like). The display 1 may be implemented in accordance with various types of digital display technology, such as LCD (Liquid Crystal Display), LED (Light-Emitted Diode), OLED (Organic Light-Emitted Diode), touchscreen-capable, and the like. The size and shape of the display 1 may vary based on the specific application and design objectives of the EV-CVAIS 100.

As seen in FIGS. 1A and 1B, the EV-CVAIS 100 comprises a removeable motherboard container 3. In the example of FIG. 1, the removeable motherboard container 3 has a substantially rectangular geometry, having an elongated flat bottom surface, two lateral surfaces, and no top surface such that the removeable motherboard container 3 is not enclosed and structured similar to a tray. Thus, the removeable motherboard container 3 has dimensions (e.g., length, width, height) and surfaces that form a shallow container suitable for stabling housing the internal electronic components that support the functionality of the EV-CVAIS 100. FIG. 1 illustrates that the removable motherboard container 3 is designed to hold the internal electronics of the EV-CVAIS 100, such as a motherboard, charging circuits, sensors, capacitors, resistors, integrated circuit chips such as microcontrollers and diodes, and other components as are typically required in the current state of the art EV charging circuits.

As will be described, the removeable motherboard container 3 functions as a physically separate module (contributing to the modular structure of the EV-CVAIS 100) that is designed to cooperatively interact with another module of the EV-CVAIS 100, namely the enclosure 9. That is, the removeable motherboard container 3 is configured to be: coupled to the enclosure 9, where it is arranged in an inserted position with the enclosure 9 such that the length of the removeable motherboard contained in placed inside of the enclosure 9 to stably hold and enclose the internal electronic components of the EV charger 100 therein; or decoupled from the enclosure 9, where it is arranged in a removed position with the enclosure 9 such that the length removeable motherboard container 3 is outside of the enclosure 9 allowing the internal electronic components of the EV charger 100 to be easily accessed.

FIGS. 1A and 1B depicts the enclosure 9 as another module of the EV-CVAIS 100, providing a main body for the EV charger's 100 structure. In the example of FIG. 1, the enclosure 9 has a substantially rectangular geometry, having surfaces, dimensions (length, width, height) and a substantively hollow internal area (e.g., compartment) that are suitable for the enclosure 9 to function as an enclosed compartment that houses the removable motherboard container 3 inside of its walls (e.g., surfaces) when the container 3 is coupled to the enclosure 9 in the inserted position. The enclosure 9 has an aperture along a lateral surface, where the aperture provides an opening to the enclosure 9 that receives the removable motherboard container 3. For example, the removable motherboard container 3 can be slidably inserted (e.g., along the rack 4) into the enclosure 9 and stably held inside of its compartment, where the enclosure 9 safely covers and stores the motherboard, circuits, and other internal electrical components that are contained therein. In this inserted position, the motherboard container 3 is fully coupled and enclosed inside of the enclosure 9, having the length of the removable motherboard container 3 being positioned inside of the internal compartment of the enclosure 9. When inserting the removable motherboard container 3 into the enclosure 9, the container 3 can be slid along the rack 4 in a direction towards the enclosure 9, until a lateral side of the container 3 is flush with the aperture, closing that surface wall of the enclosure 9 to fully enclose the internal electronics in the container 3 therein. The removable motherboard container 3 can stay in the inserted position with enclosure 9 while the EV-CVAIS 100 is in use, for example during a charging process with an EV. Alternatively, the removable motherboard container 3 can be rearranged from the inserted position, where the container 3 is removed from the enclosure 9 while the EV-CVAIS 100 remains essentially installed at the location as an EV charging station.

The removable motherboard container 3 is also configured to be decoupled (e.g., removed) from, or pulled out of, the enclosure 9. For instance, the removable motherboard container 3 is structured to slide out through the aperture (e.g., along the rack 4) of the enclosure 9 in a direction away from the body of the enclosure 9. When the removable motherboard container 3 is slidably decoupled from the enclosure 9, the length of the removable motherboard container 3 including the motherboard, circuits, and other electronic components are outside of the enclosure 9. When the removable motherboard container 3 is in the fully removed position, all of the contents of the removable motherboard container 3 are outside of the enclosure's 9 compartment, which allows for the motherboard, circuits, and other electrical components held by the container 3 to be easily accessed for repairing, replacing, upgrading, or testing while the EV charger 100 is currently at its installation location and being actively used as an EV charging station. Consequently, the EV-CVAIS 100 has a distinct structure comprised of interfacing modules 3, 9 that allow the EV charger's 100 internal electronics to be safely enclosed (e.g., enclosure 9) and removed (e.g., removable motherboard container 3), even after the EV-CVAIS 100 has been deployed.

Also, FIGS. 1A and 1B shows that there are several components on the removable motherboard container 3. In the example of FIG. 1, the removable motherboard container 3 has attachment elements 2, shown as screws, that can be used to securely attached and/or detach the removable motherboard container 3 from the enclosure 9. In an embodiment, the attachment elements 2 are screws designed with a proprietary head that requires a matching screwdriver to access them. The attachment elements 2 are positioned in each corner of the lateral surface that closes against the enclosure 9, which allows the attachment elements 2 to be used to securely fasten the removable motherboard container 3 to the enclosure 9 when in the inserted positioned. In contrast, the attachment elements 2 can be loosened in order to detach the removable motherboard container 3 from the enclosure 9. By loosening the screws, the removable motherboard container 3 can then be slidable moved out of the enclosure 9 and into the removed positioned where it is physically separated from the enclosure. The attachment elements 2 can be implemented as other forms of mechanical fastening mechanisms, including nails, bolts, nuts, clamps, anchors, rivets, as deems appropriate and/or suitable.

The removable motherboard container 3 has a rack 4 that is disposed along a bottom surface of the container 3. The rack 4 can be structured as a protruding edge that serves as a rail mechanism to support the slidable movement of the removable motherboard container 3. The rack 4 can be mated with a rack holder 5 attached to the enclosure 9. For example, the rack holder 5 may be structured as having a groove (or trench) along a bottom internal surface of the enclosure 9 that mates and accepts the protruding edge of the rack 4, in a manner that guides a horizontal movement of the removable motherboard container 3. When the rack 4 of the removable motherboard container 3 is installed in the rack holder 5, the container 3 can then move, sliding to be inserted and/or removed from the enclosure 9.

FIGS. 1A and 1B shows that there are several components on the enclosure 9. The rack holder 5 is attached to the enclosure 9 and is configured to receive the rack 4 that is attached to the removable motherboard container 3. The rack holder 5 can be formed using conductive materials such as copper among other metals and alloys, and could be secured within the enclosure 9 with magnets, hooks, and screws among other holding mechanisms to ensure stability.

As seen in FIG. 1, a front-facing surface of the enclosure 9 is shown as a face 10 of the EV-CVAIS 100. The face 10 can be a surface of the EV-CVAIS 100 that is intended to be visible and/or interactive for a user of the EV charge 100. For example, the display 1 is attached to the face 10 to provide a screen on a surface of the EV charger 100 that is facing towards the user for greater visibility, for instance displaying information pertinent to the EV charging process to be viewed by the user.

An input power cable 6 is depicted as extending from the face 10 portion of the enclosure 9. The input power cable 6 can be plugged into, or otherwise connected to, a power supply for the EV-CVAIS 100. In an embodiment, the input power cable 6 is connected to a power source such as the electric grid accessed through a wall outlet or electrical panel. In some embodiments, the input power cable 6 is connected to a power source that is integrated with the EV-CVAIS 100, such as a battery.

A charging plug 7 is also shown to extend from the face 10 portion of the enclosure 9. For example, the charging plug 7 may be a charging cable or extension, having a connector at its distal end that can be inserted directly into a charging port of an EV allowing the end of the charging plug 7 to be plugged into EV. By coupling the charging plug 7 to an EV, a transfer of electrical power (e.g., AC power) is facilitated from the EV-CVAIS 100 which supplies a charge to the EV's battery. Additionally, FIG. 1 also shows that a camera 11 may be implemented in the EV-CVAIS 100 having a lens positioned at the face 10 of the enclosure 9. The camera 11 enables image and/or video capture capabilities for the EV-CVAIS 100 and may utilize a variation of lenses such as wide-angle lens among other types and variations of cameras.

Accordingly, the EV-CVAIS 100 depicted in FIGS. 1A AND 1B realizes a modular architecture that allows portions of the EV charger 100 to be removed and re-inserted in a distinct manner. This modularity enables key components of the EV charger 100, such as the motherboard, which may degrade over time, to be accessible in a manner that supports on-site repairs, replacements, or updates, thereby substantially reducing an amount of time that a EV-CVAIS 100 has to be off-line (e.g., for repairs) in comparison to conventional EV chargers used in industry.

Figure 2:
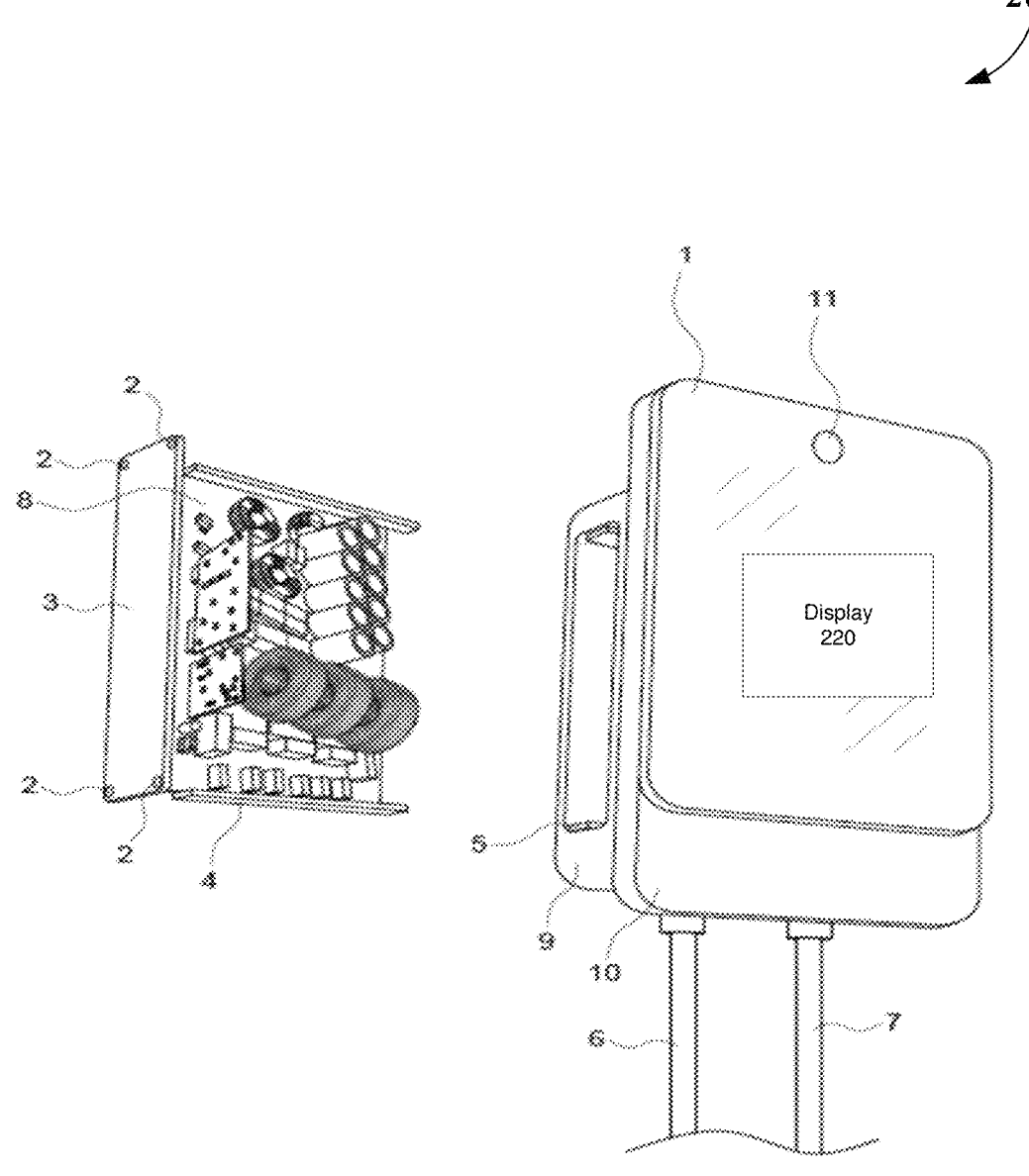
FIG. 2 depicts an example EV Charger Camera Visual Artificial Intelligence System (EV-CVAIS) at a perspective view and having the motherboard container fully removed during operation, according to one or more embodiments shown and described herein.

FIG. 2 depicts the EV-CVAIS 100, where the removeable motherboard container 3 is in a fully removed positioned. In operation, the EV-CVAIS 100 can be mechanically de-energized by disconnecting the input power cable 6 in order to safely remove the removeable motherboard container 3. The EV-CVAIS 100 can also be de-energized electronically through a signal sent wirelessly to the charging circuit via Bluetooth or Wi-Fi, among other processes and designs used in the current state of the art to de-energize live electric components. After de-energizing, the removeable motherboard container 3 can be safely unscrewed and removed from the enclosure 9 of the EV-CVAIS 100. FIG. 2 illustrates that in the fully removed position, the entire length of the removable motherboard container 3 including the motherboard, circuits, and other electronic components are completely outside of the enclosure 9 allowing these elements to be easily accessible while the EV-CVAIS 100 remains at its installed location and operating as an EV charging station. FIG. 2 shows an additional display 220 which may used in conjunction with display 1 to provide additional views of content, provide a separate menu, provide a touchscreen, and other content.

Figure 3:
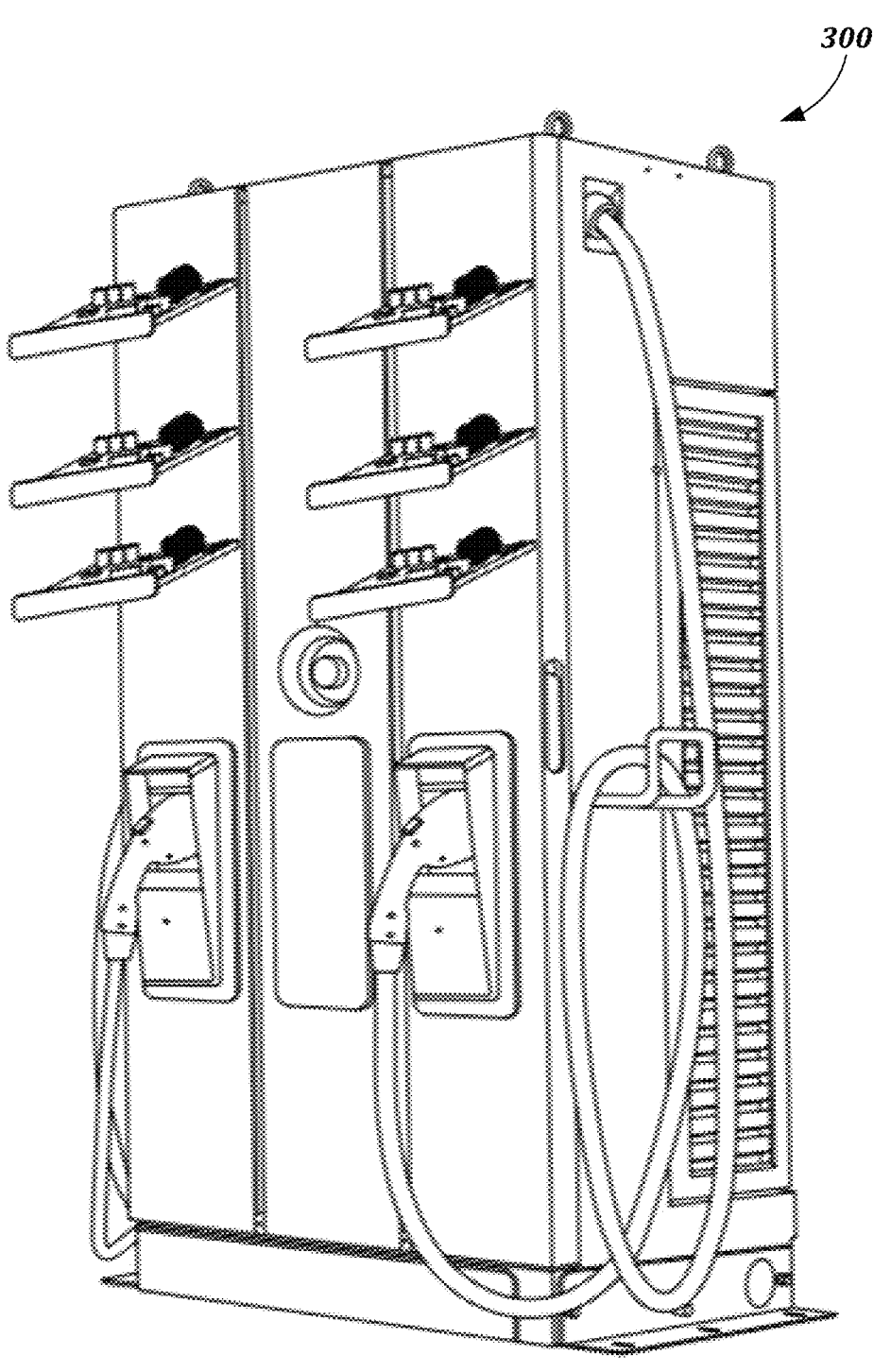
FIG. 3 depicts an example Level 3 EV charger for employing the EV Charger Camera Visual Artificial Intelligence System (EV-CVAIS) aspects, according to one or more embodiments shown and described herein.

FIG. 3 depicts a Level 3 EV charger 300 that can implement the EV-CVAIS and functions as described above in reference to FIGS. 1A AND 1B. The Level 3 EV charger 300 may be deployed as a charging station that is located at a designated location, such as a parking garage, mall parking lot, or other public location deemed suitable for EV charging. Accordingly, the Level 3 EV charger 3 can include an EVSE port that provides the power to charge at least one vehicle, and houses one or more power connectors (or plugs) that are compatible to be connected with an EV. In use, a power connector from the Level 3 EV charger 300 can be plugged into an inlet of an EV's charging port (designed to accept the appropriate connector). By coupling the system's 150 connector to the vehicle's 120 charging port, a transfer of electrical power (e.g., DC power) is facilitated which supplies a charge (e.g., shown as dashed line arrow in FIGS. 1A AND 1B) to the vehicle's 120 battery. According to the embodiments, the Level 3 EV charger 300 acts a dedicated charging station, which includes one or more EV-CVAISs, as disclosed herein, integrated into its architecture, and operates in accordance with fast charging and/or DC fast charging standards.

The Level 3 EV charger 300, also referred to as a DC fast charger, can function as a high-power charging station that is capable of providing a significantly faster charging experience compared to Level 1 EV chargers and Level 2 EV chargers. Through DC fast charging, the Level 3 EV charger 300 can provide as much as 350 KW or more of power and fully charge an EV in as quickly as 15 minutes.

FIG. 4A depicts a real-time EV charger monitoring system 400 for monitoring the operational parameters of an EV charger 410 in real-time during its operation to ensure that the EV charger 410 is operating optimally. In the example of FIG. 4A, the real-time EV charger monitoring system 400 is utilized with the EV-CVAIS 410, as disclosed herein. FIG. 4A illustrates the real-time EV charger monitoring system 400 including a plurality of sensors 420 that are integrated within the EV-CVAIS 410 in order to collect real-time measurement data from several components of the EV charger 410. Thus, by obtaining real-time data from the sensors 420, the real-time EV charger monitoring system 400 can obtain and analyze the real-time values for different operational parameters of the EV charger 410 that indicate how the EV charger 410 is currently operating.

For example, the sensors 420 obtain data in real-time that is associated with operational parameters related to the EV charging functions of the EV charger 410, including temperature, power consumption, current flow, and the like. According to the embodiments, the sensors 420 are configured to continuously obtain measurements from the internal elements (e.g., hardware, electronics, etc.) of the EV charger 410 and/or obtain measurements pertaining to the external environment surrounding the EV charger 410 in real-time (e.g., per-second) or at another defined time intervals. The sensors 420 can obtain measurements of the external environment surrounding the EV charger 410 such as moisture levels, external noise, temperature, dust, force, and the like. By monitoring the external environment of the EV charger 410, the real-time EV charger monitoring system 400 can assess how characteristics outside of the EV charger 410 structure can impact its performance, such as the EV charger's 410 resilience to different weather conditions and evaluating of the impact of noise, for instance, where this information can ultimately be leveraged to facilitate design improvements for the EV charger 410 like more durable and environmentally charging stations.

The real-time EV charger monitoring system 400 also includes a real-time EV charger monitoring controller 430. In the example of FIG. 4A, the real-time EV charger monitoring controller 430 is implemented as a computer device, such as a laptop computer, that is communicatively connected to the sensors 420 of the system 400. The EV charger monitoring controller 430 may communicate with the sensors 420 via wireless networking technology, such as Wi-Fi, Bluetooth, etc. Alternatively, the sensors 420 are connected to the real-time EV charger monitoring controller 430 via wire technology, such as a physical USB connection. Thus, the real-time EV charger monitoring controller 430 can receive the real-time data collected by the sensors 420, namely the operational parameters of the EV charger 410, in order to conduct further analysis. The real-time EV charger monitoring controller 430 can include computer hardware devices, including elements such as processor(s), central processing units(s) (CPU) or controller(s), memory that is programmed to perform the real-time monitoring functions. In an embodiment, the real-time EV charger monitoring system 400 is implemented as a computer device that is integrated within the hardware of the EV charger 410 itself.

For example, while the EV charger 410 is currently operating to charge a plugged-in EV, the real-time EV charger monitoring controller 430 can continuously receive data from the sensors 420 in real-time as a mechanism to monitor its current operational status. Furthermore, the real-time EV charger monitoring controller 430 analyzes the real-time data from sensors 420 to determine whether the measured operational parameters present any indication that the EV charger 410 is having anomalous operations, for instance operating outside of its nominal limits (e.g., errors, failures, degradation, etc.). For example, sensors 420 may be placed at the charging contacts (e.g., connectors) of the EV charger 410 which measure a temperature at the contact interface between the EV and the EV charger 410 in real-time throughout the EV charging process. The real-time EV charger monitoring controller 430 receives the real-time temperature measurements collected by the sensors 420, and subsequently monitors and analyzes the temperature operational parameter of the EV charger 410 in a manner that allows the real-time EV charger monitoring controller 430 to detect whether there are unusually high heat levels at the contact interface between the EV and the EV charger 410. In an embodiment, the real-time EV charger monitoring controller 430 is configured to utilize artificial intelligence (AI)/machine learning (ML) approaches to monitor and analyze the operational parameters of the EV charger 410. For example, real-time EV charger monitoring controller 430 can train AI/ML models over time using the real-time data collect from sensors 420 at the EVB charger 410 to be able to learn trends and predictively determine that an operational parameter is reaching and may exceed its proper limits (indicating anomalous operations).

Referring back to the previous example, in the case where the real-time EV charger monitoring controller 430 determines that there are dangerously high temperatures at the EV charger 410 during charging, the current status of that operational parameter can be an indication that there is EV charger 410 is having anomalous operations, particularly severe overheating problem at the EV charger 410 which requires immediate action, such as disconnection from the EV, shut-down of the EV charger 410, and/or repair of components at the EV charger 410. In an embodiment, the EV charger monitoring controller 430 is also configured to perform automatic corrective actions, in response to monitoring the operational parameters of the EV charger 410. For instance, the EV charger monitoring controller 430 can have the ability to automatically adjust the operation of the EV charger 410, regulating temperature (e.g., triggering cooling functions, decrease charging rate, etc.) at the EV charger 410 as result of monitoring high temperature conditions at the EV charger 410. In some embodiments, the EV charger monitoring controller 430 may be configured to execute other corrective actions related to the real-time monitoring of the operational parameters of the EV charger 410, such as optimizing charging algorithms and/or hardware enhancements, and automatically alerting maintenance personnel in the event of a detected operational problem to prevent damage (e.g., to the EV and/or the EV charger 410) or safety risks.

Thus, by actively monitoring the function of the EV charger 410 in real-time, the real-time EV charger monitoring system 400 can enhance the EV charger's charging efficiency, safety, and overall performance. Moreover, operational information for EV chargers that can be gleaned from the real-time EV charger monitoring system over time can be used to improve the design and development of EV chargers in a manner that improves on any degradation and failures detected after deployment (e.g., while the EV chargers are being used in the field), thereby providing better performance for EV chargers currently used in industry and in the future to progress the technology.

FIG. 4B depicts an example real-time EV monitoring system for use with the EV Charger Camera Visual Artificial Intelligence System (EV-CVAIS), according to one or more embodiments shown and described herein. FIG. 4B shows the sensors 420 including: internal thermometers 420A, 420B; External thermometer 420C, humidity sensor 420D, pressure sensor 420E, voltage sensor 420F, Near Field Communication (NFC) sensor 420K, camera sensor 420J, current sensor 420G, audio sensor 420H, current monitor 420I, motion sensor 420M, speaker 420H1, microphone 420H2, dust sensor 420L, and security sensor 420N. In one or more embodiments, the sensors are not all internal in 420. In at least one embodiment, one or more sensors may be external to the device as shown in FIG. 4B, 430 with camera sensor 430A, motion sensor 430B, NFC sensor 430C, external thermometer 430D, speaker 430E, microphone 430F, and at least one other external sensor represented by 430X. In this at least one embodiment, the EV monitoring controller logic system is represented by 430A. In other embodiments, this monitoring controller may take up the entire element of 430.

Computing Device Architecture

The EV-CVAIS platform depicted in 100, 200, 300, and 400 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the EV-CVAIS platform depicted in 100, 200, 300, and 400 may be hosted on a centralized server, such as, for example, a cloud computing service. Although methods 600, 700, and 800 have been described to be performed by a computing device 500, it should be understood that, in some embodiments, different operations may be performed by different networked elements in operative communication with computing device 500.

Embodiments of the present disclosure may comprise a system having a memory storage and a processing unit. The processing unit coupled to the memory storage, wherein the processing unit is configured to perform the stages of methods 600, 700, and 800.

FIG. 5 depicts a block diagram of an example computer system 500 in which the disclosed aspects of the EV-CVAIS and/or the real-time EV charger monitoring system may be implemented. Furthermore, it should be appreciated that although the various instructions are illustrated as being co-located within a single processing unit, there may be some implementations in which processor(s) includes multiple processing units, allowing one or more instructions may be executed remotely from the other instructions.

The computer system 500 includes a bus 502 or other communication mechanism for communicating information, one or more hardware processors 504 coupled with bus 512 for processing information. Hardware processor(s) 504 may be, for example, one or more general purpose microprocessors.

The computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor. In one or more embodiments, the computing device 500 comprises a Contactless Charging EV-CVAIS Module 520, a Car Maintenance EV-CVAIS Module 530, and a Security EV-CVAIS Module 540. In one or more embodiments, these are contained within the computing device 500. In one or more embodiments, there may be one or more additional modules of the aforementioned modules described in the specification embodied in computing device 500 as symbolized by 550N for a Nth EV-CVAIS module. In one or more embodiments, these modules are stored external to the computing device 500.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Python, Ruby on Rails or NodeJS. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 2400 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local networks and Internet both use electrical, electromagnetic or optical signals that carry digital data streams. The signals through the various networks and the signals on network link and through communication interface 518, which carry the digital data to and from computer system 510, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution. In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

Platform Operation

Figure 6:
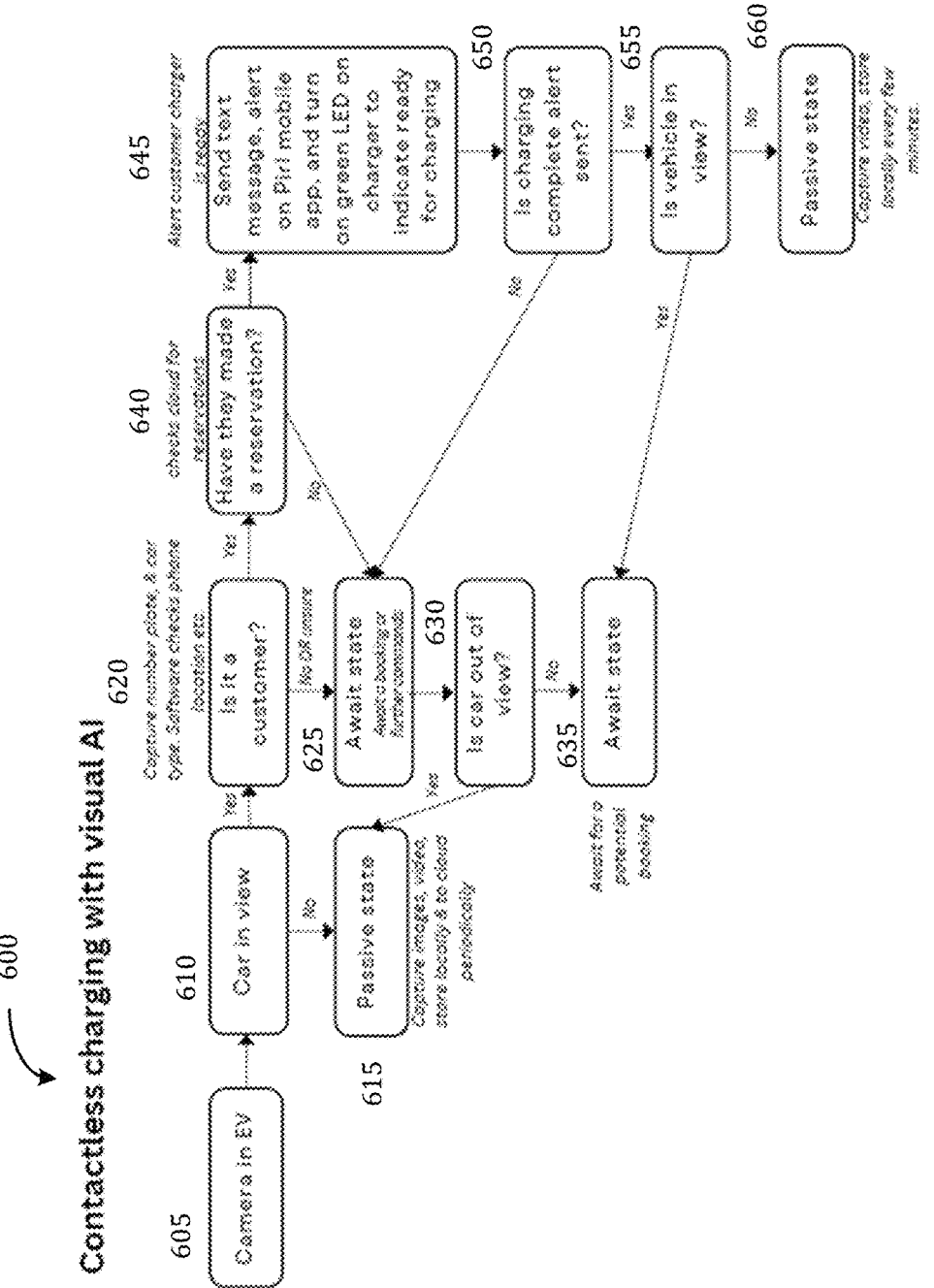
FIG. 6 is a flow chart of a method for providing contactless charging using the EV Charger Camera Visual Artificial Intelligence System (EV-CVAIS).
Figure 8:
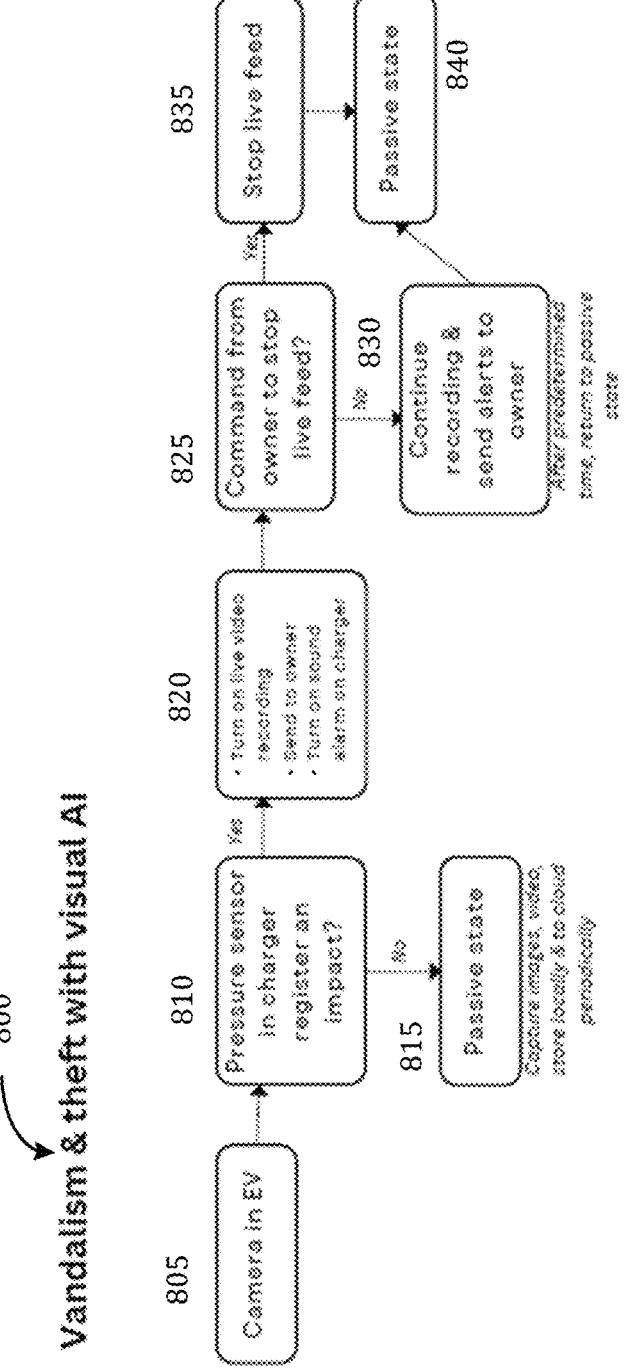
FIG. 8 is a flow chart of a method for providing vandalism and theft deterrent charging using the EV Charger Camera Visual Artificial Intelligence System (EV-CVAIS).

FIG. 6 is a flow chart setting forth the general stages involved in a method 600 consistent with an embodiment of the disclosure for providing EV-CVAIS platform depicted in 100, 200, 300, and 400. Method 600 may be implemented using a computing device 500 as described in more detail below with respect to FIG. 5.

Although method 600 has been described to be performed by computing device 500, it should be understood that, in some embodiments, different operations may be performed by different networked elements in operative communication with computing device 500. For example, server and/or computing device 500 may be employed in the performance of some or all of the stages in method 600. Moreover, server may be configured much like computing device 500 and, in some instances, be one and the same embodiment. Similarly, EV-CVAIS apparatus depicted in 100, 200, 300, and 400 may be employed in the performance of some or all of the stages in method 600. Apparatus 100, 200, 300, and 400 may also be configured much like computing device 500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 600 will be described in greater detail below.

Steps for Contactless Payment:

Camera Setup: A camera system is installed on the EV charger, positioned to capture the parking area for vehicles during charging. Typically mounted on the charger or nearby infrastructure, like poles or walls, it offers a clear view of the vehicle.

Vehicle Identification: Upon a vehicle's approach to the charger, the camera system detects its presence through motion detection or image analysis. It captures images or videos, focusing on specific features such as license plates, vehicle make and model. Additional data from the charger, like phone location obtained through a company mobile app, confirms the vehicle's proximity and prior registrations.

Image Processing: Computer vision algorithms process captured images or video frames. Object detection algorithms extract relevant information like license plate numbers, make and model, color, and visible damage.

Database Query: Extracted information is compared with a database of registered users or authorized vehicles. If recognized and authorized, the system initiates charging; otherwise, it prompts user authentication or registration.

User Interaction: For authorized vehicles, the system provides feedback on charging initiation or requests necessary input (e.g., payment confirmation). Users may interact visually using gestures or mobile device QR codes to manage charging sessions.

Data Logging and Analytics: Charging sessions and associated visual data are logged for security and analysis. Analytics tools generate insights on usage patterns, efficiency, and maintenance needs.

Remote Access and Control:

The camera system integrates with a central management platform for remote monitoring and control of multiple charging stations. Operators access live video feeds, manage sessions, and troubleshoot remotely, enhancing operational efficiency and customer support.

Contactless Charging with EV-CVAIS (600)

Method 600 may begin at starting block 605 where the camera in the EV-CVAIS is activated. In one or more embodiments, the camera is activated by a motion sensor, proximity sensor, change in external temperature, change in humidity, change in voltage, change in pressure, change in sound, change in dust, change in near field communication sensor, in response to a user or remote user command, or other event trigger. Once the EV-CVAIS camera is activated, the camera may capture images, video, and information to store locally or in a cloud computing location. After activation of the camera in 605, the EV-CVAIS may proceed to stage 610 where computing device 500 may analyze the imaging data received to determine if a car is in view.

From stage 610, where computing device 500 analyze the imaging data received to determine if a car is in view, method 600 may advance to stage 615 if there is no car in view where the EV-CVAIS platform may stay in a passive state, periodically capturing images, video, and information to store locally or in a cloud computing location. If there is a car in view, computing device may proceed to stage 620 where computing device 500 may capture a license plate number, car type, and check for a phone location to determine if the proximate vehicle is an EV customer scheduled to charge.

Once computing device 500 capture a license plate number, car type, and check for a phone location to determine if the proximate vehicle is an EV customer scheduled to charge. in stage 620, method 600 may continue to stage 625, an await state to await a booking confirmation or further commands. Method 600 may also continue to stage 640 to determine if any reservations have been made for this time period by checking the cloud for reservations. If there are no reservations, method 600 remains in the await state of stage 625. If the car goes out of view of the camera, the method 600 may proceed to stage 630 then back to passive state, stage 615. If the car is not out of view the method may proceed to another await state of stage 635.

After computing device 500 determines that a reservation has been made in stage 640, method 600 may proceed to stage 645 where computing device 500 may alert customer charger is ready. This may be accomplished by sending a text message to the user, sending an alert on the Pirl mobile app or other application, turning the light on the EV-CVAIS from red to green to indicate a charger is ready and available.

Once computing device 500 alert customer charger is ready in stage 645, method 600 may proceed to determine if the charging complete alert has been sent at stage 650. This alert is only sent when charging is completed. If charging is not completed, then the system is charging in the await state of stage 625. If the charging is completed and the alert has been sent, then method 600 may proceed to stage 655 where the EV-CVAIS checks to see if the car is still in view. If the vehicle is still in view, the we must proceed to the await state of stage 635. If the vehicle is no longer in view, then the method 600 proceeds to a passive state 660 and ends at stage 650 only to restart once another vehicle approaches.

Car Maintenance with EV-CVAIS (700)

Method 700 may begin at starting block 705 where the camera in the EV-CVAIS is activated. In one or more embodiments, the camera is activated by a motion sensor, proximity sensor, change in external temperature, change in humidity, change in voltage, change in pressure, change in sound, change in dust, change in near field communication sensor, in response to a user or remote user command, or other event trigger. Once the EV-CVAIS camera is activated, the camera may capture images, video, and information to store locally or in a cloud computing location. After activation of the camera in 705, the EV-CVAIS may proceed to stage 710 where computing device 500 may analyze the imaging data received to determine if a car is in view.

From stage 710, where computing device 500 analyze the imaging data received to determine if a car is in view, method 700 may advance to stage 715 if there is no car in view where the EV-CVAIS platform may stay in a passive state, periodically capturing images, video, and information to store locally or in a cloud computing location. If there is a car in view, computing device may proceed to stage 720 where computing device 500 may capture a license plate number, car type, and check for a phone location to determine if the proximate vehicle is an EV customer scheduled to use the EV-CVAIS.

Once computing device 500 capture a license plate number, car type, and check for a phone location to determine if the proximate vehicle is an EV customer scheduled to use the EV-CVAIS. in stage 720, method 700 may continue to stage 725, an await state to await a booking confirmation or further commands. Method 700 may also continue to stage 740 to determine if any reservations have been made for this time period by checking the cloud for reservations, if so the method 700 proceeds to take snapshots of car tires, windshield, and every part of the car in view. If there are no reservations, method 700 remains in the await state of stage 725. If the car goes out of view of the camera, the method 700 may proceed to stage 730 then back to passive state, stage 715. If the car is not out of view the method may proceed to another await state of stage 735.

After computing device 500 determines that a reservation has been made method 700 proceeds to take snapshots of car tires, windshield, and every part of the car in view in stage 740, method 700 may proceed to stage 750 where computing device 500 may compare images with manufacturer images of a new car. This may be accomplished by utilizing the Pirl mobile app or other application provided by the manufacturer. These images are processed and a determination is made at stage 755. If there are no deviations, the EV-CVAIS method may proceed to a Passive state stage 745.

If there are major deviations, method 700 may proceed to send an alert to the dealer and customer and manufacturer with the names of the parts and images. The EV-CVAIS may also provide recommendations at stage 760. Method 700 then proceeds to a passive state and ends at stage 760 only to restart once another vehicle approaches or another reservation is made.

Security with EV-CVAIS (800)

Method 800 may begin at starting block 805 where the camera in the EV-CVAIS is activated. In one or more embodiments, the camera is activated by a motion sensor, proximity sensor, change in external temperature, change in humidity, change in voltage, change in pressure, change in sound, change in dust, change in near field communication sensor, in response to a user or remote user command, or other event trigger. Once the EV-CVAIS camera is activated, the camera may capture images, video, and information to store locally or in a cloud computing location. After activation of the camera in 805, the EV-CVAIS may proceed to stage 810 where computing device 500 may analyze the sensor data received to determine if the pressure sensor registers an impact, the audio sensor detected loud noise, the humidity sensor detected water, the temperature sensor detected extreme temperatures, the voltage sensor, current sensor, or power sensor detected any power anomalies. If the determination is negative, the method 800 proceeds to a passive state stage 815. The EV-CVAIS platform may stay in a passive state, periodically capturing images, video, and information to store locally or in a cloud computing location. If the determination is affirmative, the EV-CVAIS may turn on live video recording, send alerts and notification to the owner, turn on sound and activate the alarm system. In one or more embodiments, the EV-CVAIS may be configured to dial 911 or contact local law enforcement and send the video feed as well as the alert.

Once computing device 500 performs security deterrent measures. in stage 820, method 800 may continue to stage 825, where EV-CVAIS awaits commands from the owner to either stop the live feed or continue recording and send alerts to owner. After a predetermined time, the EV-CVAIS will return to a passive state 840. If the owner commands the EV-CVAIS to stop the live feed, the live feed will end at stage 835. The method 800 proceeds to a passive state 840 and ends at stage 840 only to restart once another sensor is activated or another vehicle approaches.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system comprising:
    an electric vehicle (EV) charger camera visual artificial intelligence system (EV-CVAIS);
    an EV charging station;
    a camera mounted on the EV charging station;
    a computing device integrated within the EV charging station, the computing device comprising, at least one of the following integrated within the EV charging station executing an electric vehicle (EV) charger camera visual artificial intelligence module: a processing unit, and a memory storage;
    wherein the computing device is embodied as at least one of: a mobile computing device, a tablet, a smartphone, a drone, a wearable camera, a handheld camera, an installed camera, and a remotely operable recording device;
    wherein the computing device further comprises sensing devices, wherein the sensing devices further comprise at least one of: a camera, a speaker, and a microphone;
    wherein the computing device communicates with the sensing devices;
    wherein the sensing devices provide telemetry data associated with the computing device;
    wherein the electric vehicle (EV) charger camera visual artificial intelligence system (EV-CVAIS) is integrated into the EV charging station and detecting vehicle presence and readiness to charge based on visual inputs captured by the camera mounted on the EV charging station;
    wherein the camera provides data to an onboard computing module executing AI-based object recognition algorithms;
    wherein the EV-CVAIS is a component of an EV charger;
    wherein the computing device having the processing unit follows a set of computer instructions enabling the operation of at least one of the following modules: a Temperature Module, a Humidity Module, a Pressure Module, a Voltage Module, a Power Module, a Current Module, a Near Field Communication (NFC) Module, a Motion Module, an Audio Module, an Alarm Module, a Security Module, a Visual AI Module, a Dust Module, an EV-CVAIS Module, a Content Display Module, Content Transmission Module, and a Streaming Module; and
    wherein the EV-CVAIS performs at least one of the following:
        capturing images and video of the EV and its surroundings, regardless of charging status and EV presence, providing for viewing with at least one of local storage and cloud based storage,
        providing security of the EV by detecting and deterring theft and vandalism,
        analyzing capture images and video utilizing visual AI algorithms, wherein the visual AI algorithms perform at least one of:
            determining EV make and model identification,
            determining maintenance issue detection,
            determining EV occupancy assessment,
        activating of an integrated alarm system when sensing devices detect vandalism and certain actions triggering activation.

2. The system of claim 1, the system controlling at least one of: a user interface module, a content capturing module, a timing module, a location module, an orientation module, and a communications module; and wherein the EV-CVAIS comprises a convolutional neural network trained to detect vehicle alignment and charging port visibility.

3. The system of claim 1, wherein the camera is used for security purposes, including but not limited to detecting and deterring theft and vandalism of the electric vehicle and its charging station; and wherein the EV-CVAIS further includes edge-based object classifiers identifying charging port readiness.

4. The system of claim 1, further comprising a network connection for viewing of the captured images and videos; and wherein a controller is transmitting telemetry feedback to at least one of a mobile application and utility network interface based on an AI-classified readiness state.

5. The system of claim 1, further comprising a local storage device that stores the captured images and videos; and further comprising a modular architecture wherein a base version includes the camera and an AI module, and a premium version includes additional environmental sensors selected from the group consisting of audio sensors, thermal sensors, voltage monitors, and motion detectors.

6. The system of claim 1, further comprising an onboard battery for powering the camera and other internal components during a power outage; and wherein at least one visual AI algorithm is utilized by the EV-CVAIS to perform at least one of: analyze captured images or video, offering insights such as EV make and model identification, detect a maintenance issue, and assess EV occupancy status.

7. The system of claim 1, further comprising visual AI algorithms that analyze the captured images and video to provide valuable insights.

8. The system of claim 1, wherein the at least one module processes image data captured by the cameras integrated within the EV charging station.

9. A method performed by an electric vehicle (EV) charging station, the method comprising:

activating one or more cameras mounted on an electric vehicle (EV) charging station;

integrating charging station mounted cameras with an electric vehicle (EV) charger camera visual artificial intelligence system (EV-CVAIS) in the electric vehicle (EV) charging station;

capturing image data using one or more cameras integrated within the charging station wherein image data comprises at least one of: images, video, and information to store, wherein storage is locally within the electric vehicle (EV) charging station;

analyzing operational sensor data from sensors integrated within the electric vehicle (EV) charging station by the electric vehicle (EV) charger camera visual artificial intelligence system (EV-CVAIS) to determine at least one of:

a pressure sensor registered an impact, an audio sensor detected loud noise above a predetermined sound threshold, a humidity sensor detected water, a temperature sensor detected extreme temperatures, a voltage sensor detected a power surge, a current sensor detected a power surge, a power sensor detected a power surge;

determining no sensor has been triggered, thereby remaining in a passive state;

wherein remaining in a passive state, further comprises:

periodically capturing at least one of: images, video, and information to store, wherein storage is locally within the electric vehicle (EV) charging station;

upon determining that a sensor among the sensors integrated within the electric vehicle (EV) charging station has affirmatively been triggered, the EV-CVAIS performs at least one of:

activating live video recording, sending alerts to an owner, notifying the owner, activating sound, and activating an alarm system;

wherein the electric vehicle (EV) charger camera visual artificial intelligence system (EV-CVAIS) classifies visual indicators captured by the camera and transmits instructions to initiate charging without requiring manual input from the vehicle or user; and wherein image processing and decision-making occurs locally within the EV charging station.

10. The method of claim 9, further comprising the EV-CVAIS performing at least one of:

dialing an emergency contact;

dialing local law enforcement;

sending the live video recording to an emergency contact;

sending the live video recording to local law enforcement; and wherein visual AI processing includes at least one of: evaluating EV charger vehicle open or closed port status, and ambient lighting conditions.

11. The method of claim 9, wherein the EV-CVAIS performs at least one of the following responsive to commands from the owner:

deactivating the live feed;

continuing recording and sending alerts to the owner; and further comprising transmitting a status signal to a grid operator and cloud dashboard based on AI-classified visual data.

12. The method of claim 9, wherein the camera is activated by triggering of at least one of: a motion sensor, a proximity sensor, a change in external temperature, a change in humidity, a change in voltage, a change in pressure, a change in sound, a change in dust, a change in near field communication sensor, and in response to a user command.

13. The method of claim 9, wherein the EV-CVAIS returns to a passive state.

14. The method of claim 9, further comprising:

analyzing, by a processor of the electric vehicle charging station, data acquired from one or more sensors integrated within the electric vehicle charging station to determine whether a vehicle is within a threshold distance near the electric vehicle charging station;

determining, by a visual artificial intelligence integrated into the electric vehicle charging station, whether at least one sensor of the one or more sensors has been triggered;

responsive to determining that the at least one sensor has been triggered, performing at least one of:

capturing vehicle-related data by the camera, determining, by the processor, whether the vehicle-related data matches a scheduled booking request, notifying, by the processor, a vehicle driver regarding charging status, or determining, by the processor, that the vehicle has left the electric vehicle charging station; and wherein image processing and decision-making are performed by the visual artificial intelligence.

15. A method for operating an electric vehicle charging station, the method comprising:

activating at least one camera coupled to the electric vehicle charging station;

capturing image data using the at least one camera coupled to the electric vehicle charging station;

analyzing sensor data received by an electric vehicle (EV) charger camera visual artificial intelligence system (EV-CVAIS) integrated into the electric vehicle charging station, by a processor disposed within the electric vehicle charging station to determine if a vehicle is within a threshold distance near the electric vehicle charging station, determining, by a processor disposed within the electric vehicle charging station, no sensor has been triggered, thereby remaining in a passive state;

wherein remaining in a passive state, further comprises:

periodically capturing, by the at least one camera coupled to the electric vehicle charging station, at least one of: images, video, and information to store, wherein storage is at least one of locally and remotely;

upon determining that a sensor, disposed within the electric vehicle charging station, has affirmatively been triggered, the EV-CVAIS performs at least one of:

capturing vehicle data, by the electric vehicle charging station, wherein vehicle data is at least one of license plate number, car type, vehicle model, phone location;

determining, by a processor disposed within the electric vehicle charging station, vehicle data matches a scheduled booking request;

capturing, by the at least one camera coupled to the electric vehicle charging station, snapshots of vehicle tires, windshield, and every part of the vehicle in view;

comparing, by the at least one camera coupled to the electric vehicle charging station, captured snapshots with manufacturer provided images of a new vehicle;

determining a degree of difference or congruence between the captured snapshots and the manufacturer provided images;

assessing the degree of difference to determine if the degree of difference meets a predetermined threshold;

notifying a vehicle driver, the manufacturer, and a dealer regarding a vehicle status including recommendations and one or more parts that need to be repaired, when determined the degree of difference meets the predetermined threshold;

notifying the vehicle driver and returning to a passive state, that a charging cycle is complete, when the determined the degree of difference does not meet the predetermined threshold;

classifying, by the electric vehicle (EV) charger camera visual artificial intelligence system (EV-CVAIS), visual indicators captured by the camera and transmits instructions to initiate charging without requiring manual input from the vehicle or user; and performing image processing and decision-making occurs locally within the EV charging station.

\*   \*   \*   \*   \*